March 13, 1945. H. F. EBY 2,371,158
BRAKE MECHANISM
Filed Nov. 24, 1939 9 Sheets-Sheet 1

INVENTOR.
HARRY FORNEY EBY
BY
Caesar and Rivise
ATTORNEY

March 13, 1945. H. F. EBY 2,371,158
BRAKE MECHANISM
Filed Nov. 24, 1939 9 Sheets-Sheet 2

INVENTOR.
HARRY FORNEY EBY
BY
Caesar and Rivise
ATTORNEYS.

March 13, 1945.     H. F. EBY     2,371,158
BRAKE MECHANISM
Filed Nov. 24, 1939     9 Sheets-Sheet 3
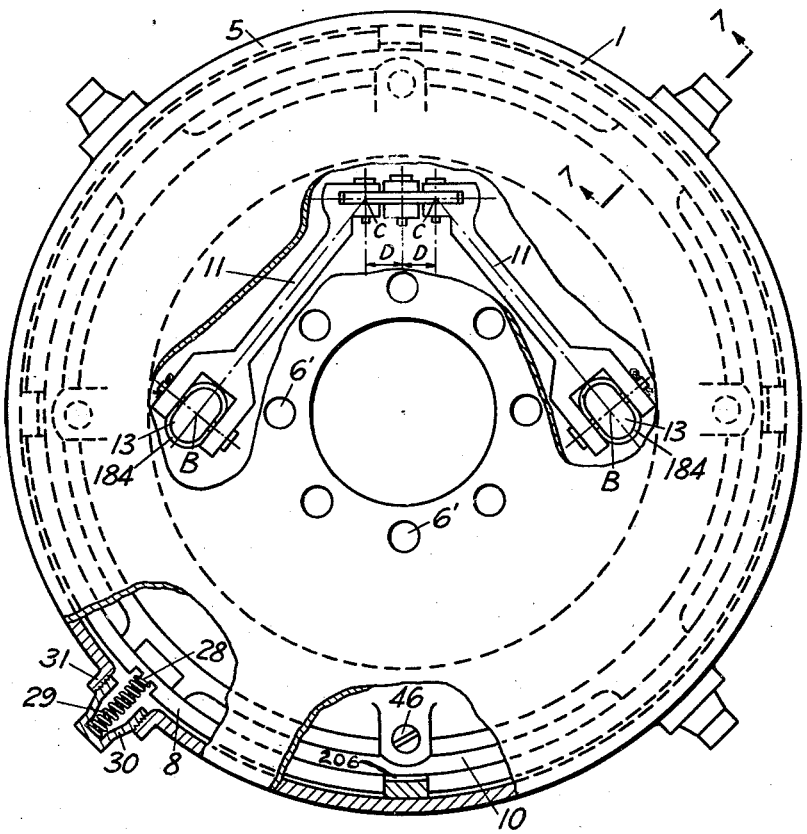
FIG. 6
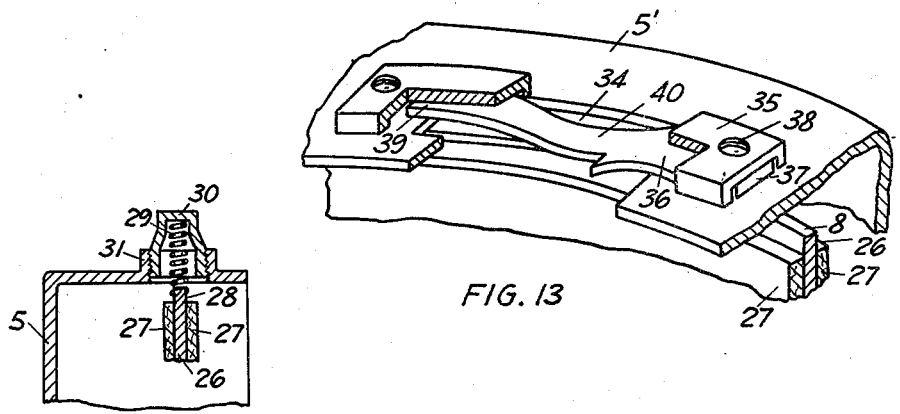
FIG. 7
FIG. 13
INVENTOR.
HARRY FORNEY EBY
BY
Caesar and Rivise
ATTORNEYS March 13, 1945.  H. F. EBY  2,371,158
BRAKE MECHANISM
Filed Nov. 24, 1939  9 Sheets-Sheet 4

INVENTOR.
HARRY FORNEY EBY
BY
Caesar and Rivise
ATTORNEYS.

March 13, 1945.  H. F. EBY  2,371,158
BRAKE MECHANISM
Filed Nov. 24, 1939  9 Sheets-Sheet 5

INVENTOR.
HARRY FORNEY EBY
BY
Caesar and Rivise
ATTORNEYS

March 13, 1945.                 H. F. EBY                    2,371,158
                            BRAKE MECHANISM
                        Filed Nov. 24, 1939              9 Sheets-Sheet 6

Inventor:
HARRY FORNEY EBY

By
Caesar and Rivise
                    Attorneys.

March 13, 1945.   H. F. EBY   2,371,158
BRAKE MECHANISM
Filed Nov. 24, 1939   9 Sheets-Sheet 7

Inventor.
HARRY FORNEY EBY
By
Caesar and Rivise
Attorneys.

March 13, 1945.   H. F. EBY   2,371,158
BRAKE MECHANISM
Filed Nov. 24, 1939   9 Sheets-Sheet 8

INVENTOR.
HARRY FORNEY EBY
BY
Caesar and Rivise
ATTORNEYS.

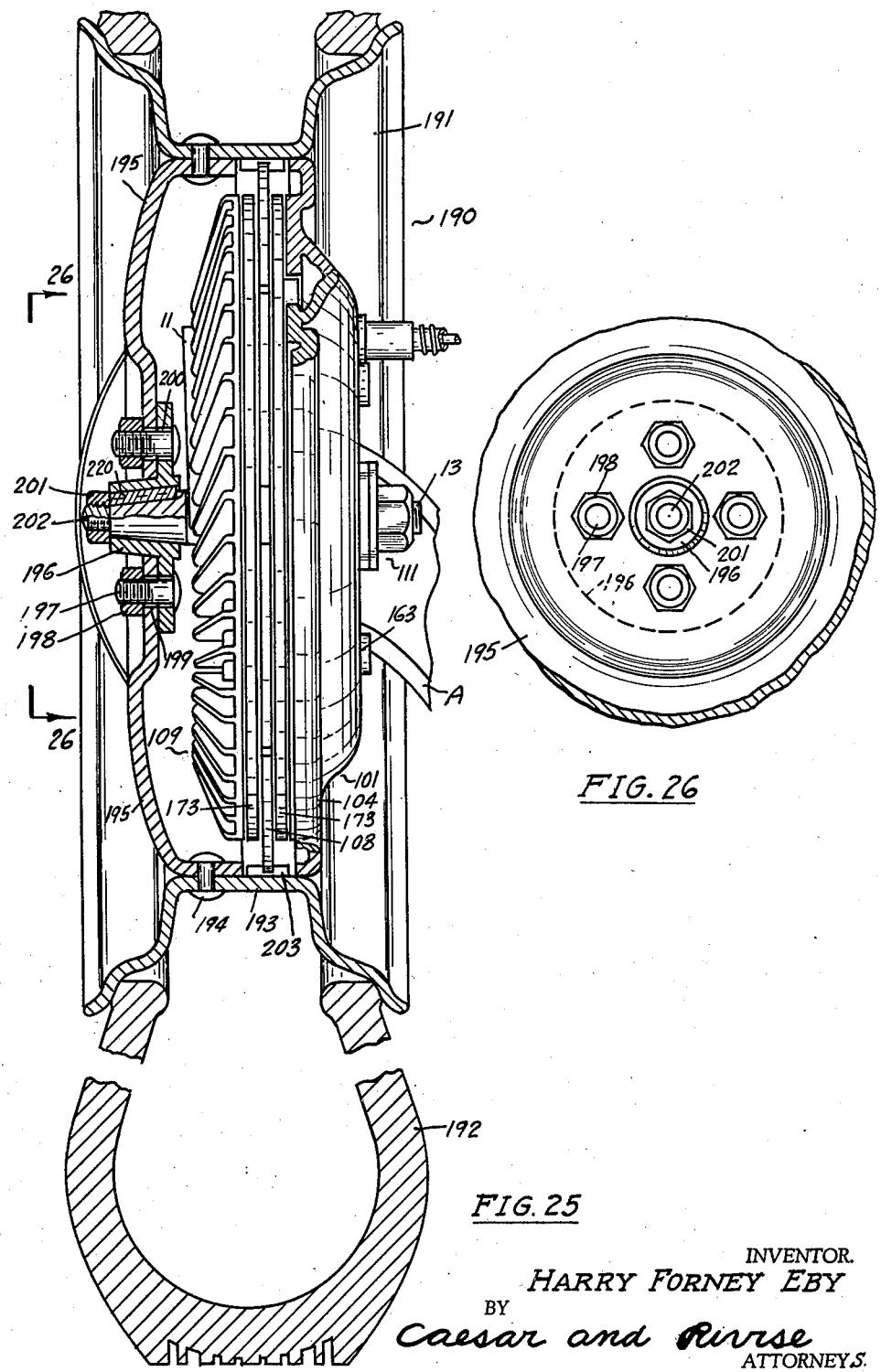

Patented Mar. 13, 1945

2,371,158

UNITED STATES PATENT OFFICE 2,371,158

BRAKE MECHANISM

Harry Forney Eby, Lebanon, Pa.

Application November 24, 1939, Serial No. 305,969

8 Claims. (Cl. 188—72)

This application is a continuation in part of application Serial No. 594,656 filed by me on February 23, 1932, now abandoned, and of application Serial No. 736,915 filed by me on July 25, 1934, now forfeited.

This invention relates to brakes and has for its object the provision of an improved brake capable of use in either mechanical, power, hydraulic or pneumatic brake systems.

The high speeds at which vehicles are driven today make necessary the use of very efficient brakes. In self energizing brakes which are now in general use, a comparatively hard brake lining must be used because of the high pressure which is obtained and a comparatively hard drum braking surface must be used because of the hard lining. The high pressure results in the development of a great amount of heat and in the chipping of the brake drum metal. This chipped metal becomes embedded in the brake lining and acts as an abrasive element to further score the brake drum. The heat fuses the small particles of chipped metal which in their fused state coalesce with the other small particles to form larger particles which in turn increase the damage caused. Further the heat generated in the application of the brake results in the distortion of the brake drum which in turn results in the locking of the wheels, thus resulting in uncontrolled action by the brake proper. Further, the clearance in self energizing brake-bands must be exactly right, otherwise proper braking action will not be obtained even if the brake-lining is properly centralized. Further, as the wheel bearing wears the wheel becomes inclined as does the brake drum which it carries. This results in the drum bearing on the inside edge of the brake lining on top and on outside edge of the brake lining on the bottom thus decreasing the effective braking area. Further, in going down grade with the brakes on heat causes expansion of the drum. Since the brake drum expands unequally, and the brake-shoe elongates, this action results in the contact of the band with the drum only at the nose and toe. All of the above result in the necessity of comparatively frequent adjustments of the brake-shoe to compensate for normal wear. Misadjustment may result in either a hard pedal, locked wheels, or no brake action at all. Misadjustment may further result in spot contact between the brake-drum and brake lining thus decreasing the effective braking area. Proper adjustment is not often had since this can be achieved only by a very skilled mechanic.

It is the object of this invention to obviate all of the above objectionable features in brake mechanisms and yet produce a highly efficient brake for all speed conditions.

Hydraulic brakes are usually adjusted merely by pumping fluid into the master cylinder or the wheel cylinders as may be deemed necessary. This, however, does not properly adjust the brake since it merely makes the brake-lining in the shoe eccentric. It is an object of this invention to produce a brake capable of use with hydraulic systems which will be free of this defect.

Further, in going down grade with the brakes on expansion due to heat causes the brake-drum to draw away from the shoe. This results in an increase in the distance which the pedal must travel in order that the brake be applied. This expansion is often so great that the pedal can be pushed down to the floor board without applying the brake. It is obvious that under such circumstances the efficacy of the brake is temporarily destroyed. It is another of the objects of this invention to produce a brake wherein the objection set forth in this paragraph is entirely obviated.

Further, because of the difference in relative expansion between the brake-drum and brake-shoe of brakes now in general use it becomes necessary during the application of the brake to cause the brake pedal to travel an additional distance in order to keep constant the decelerating force present when the brake was originally applied. It is another of the objects of this invention to produce a brake wherein a certain pedal travel will produce a decelerating force which will be constant from the moment of brake application to the moment of stoppage.

Further, the high speeds and heavy traffic of the present time makes necessary brakes which will cause the maximum deceleration in the minimum time so that a car to which they are attached can be halted quickly and within a comparatively short distance. This has resulted in the use of self-energizing and hydraulic brakes. Both of these types of brakes are objectionable because they are not fully controlled by the pedal action. The self-energizing brakes are only about 40% to 50% controlled by the pedal action and the hydraulic brakes are about 80% controlled by the pedal action. It is another of the objects of this invention to produce a brake which will be practically 100% controlled by the pedal action.

Further, brakes now in general use are often rendered inoperative or their effectiveness destroyed because of water or grease which comes into contact with the braking surfaces. Once the water or grease comes into contact with these surfaces centrifugal force tends to spread the same when the car runs. It is a further object of this invention to produce a brake wherein it will be practically impossible for either water or grease to come into contact with the braking surface and wherein centrifugal force, present when the element to which the brake is attached is running, will operate to remove the said water or grease from the said braking surfaces.

Further, it is very difficult if not impossible to determine the clearance in brakes now in general use when adjusting the same even with feeler gauges. It is an object of my invention to provide a brake with means which will automatically determine the clearance between the brake lining and brake shoe when the brake is being adjusted.

It is a further object of my invention to produce a brake wherein the heat produced during the braking action will be dissipated with comparative rapidity, without materially affecting the strength of the braking elements.

It is a further object of my invention to produce a brake having a warp-proof brake disk.

It is a further object of this invention to produce a brake capable of producing rapid deceleration which will be easy to manufacture, assemble and produce.

It is a further object of this invention to provide a brake wherein brake-lining can be used for both brake contacting surfaces.

It is a further object of this invention to provide a brake wherein both surfaces of the brake-lining will function to produce deceleration.

It is a further object of this invention to provide a brake having the advantages hereinabove specified and wherein the dust plate of the brake will form an integral part of the wheel with which the brake is to be associated.

I accomplish my purposes by substituting cooperating flat braking surfaces for peripheral braking surfaces now in use; by so suspending that cooperating braking surface carried by the wheel or brake-drum that it will be movable in a plurality of planes with respect thereto so as to maintain a position parallel to the other cooperating braking surfaces no matter how the wheel inclines upon its bearing; by so forming and positioning the member through which pressure is applied to the braking elements that the heat generated in the braking operation can be most rapidly dissipated, that uniform pressure is transmitted at the braking surfaces and so as to avoid distortion of the braking elements due to pressure; by providing means whereby inequalities in pressure or adjustment in the brake surfaces whether in one wheel or in all of the wheels will automatically be compensated for; by so forming the means which serve to bind the brake elements together that they will also function as spacing and adjusting means for the brake elements and as automatic clearance determinants for the same; by so forming the device that practically the same foot pressure will result in the same deceleration no matter whether the foot pedal has comparatively little travel, as when the brake-lining is new, or comparatively great travel, as when the brake-lining is old; by so forming and positioning the relative parts of the unit that wear will be automatically compensated for; by providing the brake disks with slots so that warping of the same due to expansive and contractive forces is avoided; by so forming and positioning the relative parts so that brake-lining of any thickness may be used in the unit; and by floating the brake-linings so that both surfaces thereof can function to produce deceleration.

I have incorporated my invention in a preferred structure which is more particularly described in the following specifications and in the drawings which form a part thereof.

In the drawings wherein similar reference numerals denote similar parts,

Figure 6 (sheet 3) is a front view of my improved brake band as a unit including the dust plate, parts of the dust plate being broken away and parts being shown in section for the purpose of more clearly showing otherwise hidden parts.

Figure 7 (sheet 3) is a section taken through the dust plate along the lines 7—7 of Figure 6.

Figure 10 (sheet 1) is a side view showing a fragment of my device including one of the lever arms, the full lines showing one position of the clamping ring, the lever arm, and associated parts and the dot and dash lines showing another position assumed by the said elements. A portion of a lug has been broken away to show the relative position of the anchor pin as it passes through the aperture in the lug.

Figure 1:
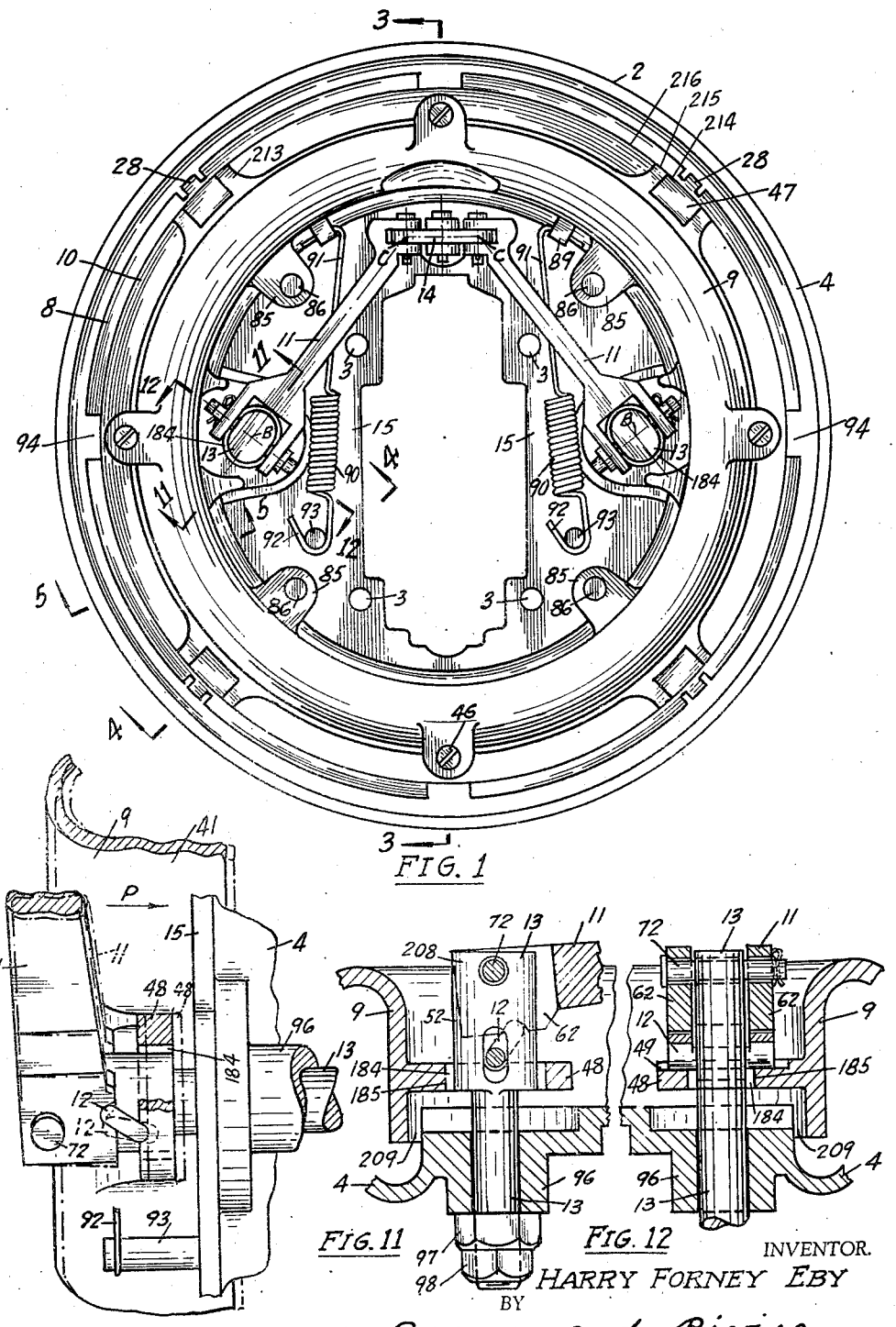
Figure 1 is a front view of my improved brake unit assembled and ready for being attached to the vehicle axle with which it is to be associated.

Figure 11 (sheet 1) is a section of a fragment along the line 11—11 of Figure 1.

Figure 12 (sheet 1) is a section of a fragment taken along the line 12—12 of Figure 1.

Figure 13 (sheet 3) is a perspective view showing a modified structure used to prevent rattle in the rotary lining disk.

Figure 14:
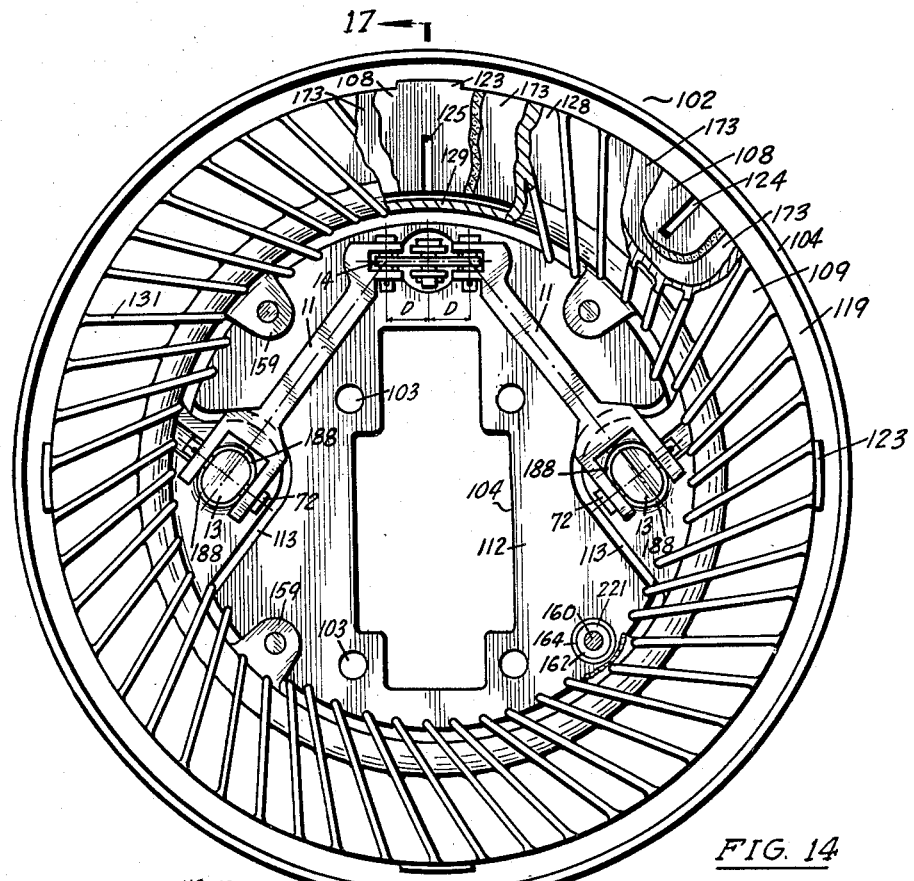

Figure 14 (sheet 5) is a front view of a modified form of my improved brake unit assembled and ready for being attached to the vehicle axle with which it is to be associated. Parts of the movable clamping ring and brake lining have been broken away for the purpose of more clearly illustrating the structure of the unit.

Figure 15:
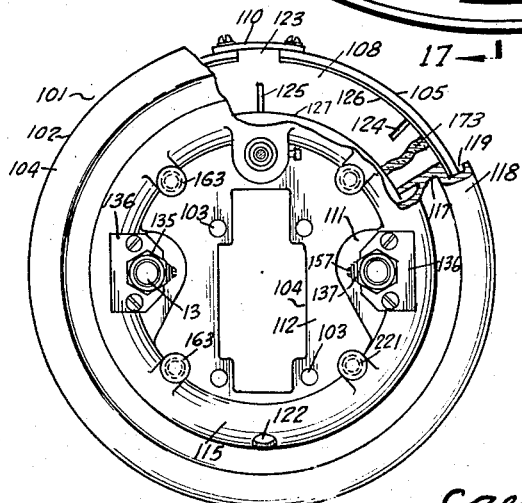

Figure 15 (sheet 5) is a rear view (on a somewhat smaller scale than that to which Figure 14 was drawn) of the brake shown in Figure 14. Parts of the stationary clamping ring and one of the brake linings have been broken away to more clearly show otherwise hidden parts.

Figure 16:
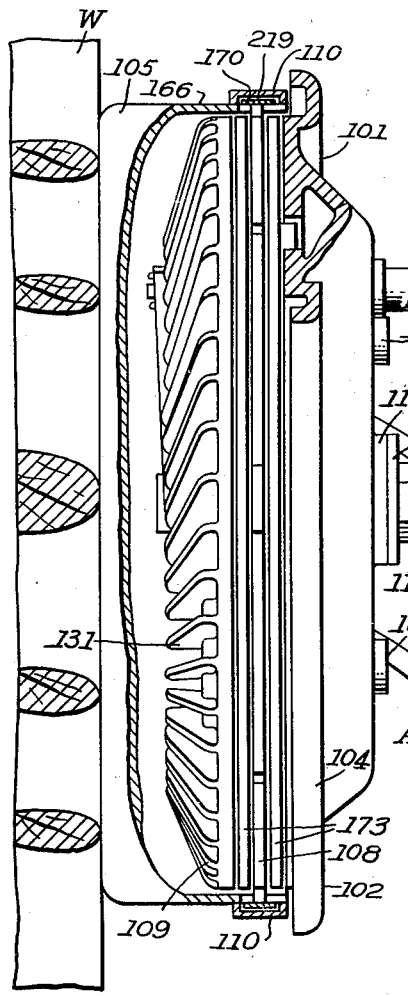

Figure 16 (sheet 6) is a side view of the unit shown in Figure 14 when attached to the vehicle wheel and axle, fragments of the wheel and axle also being shown. Parts of the dust plate and the stationary clamping ring have been broken away for the purpose of clearness.

Figure 17:
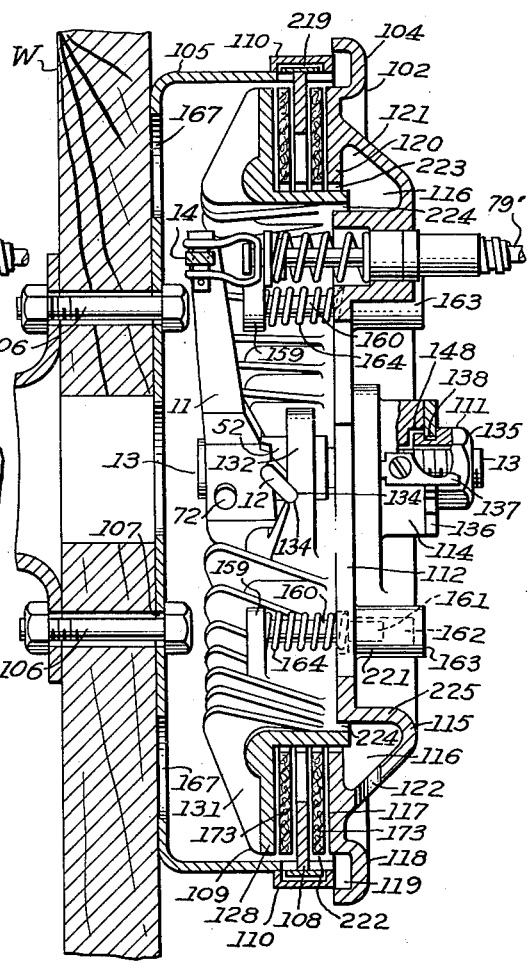

Figure 17 (sheet 6) is a section taken along the lines 17—17 of Figure 14. Parts of the brake spacing or adjusting and automatic clearance determinant structure have been broken away for the purpose of more clearly illustrating the structure of this unit.

Figure 18:
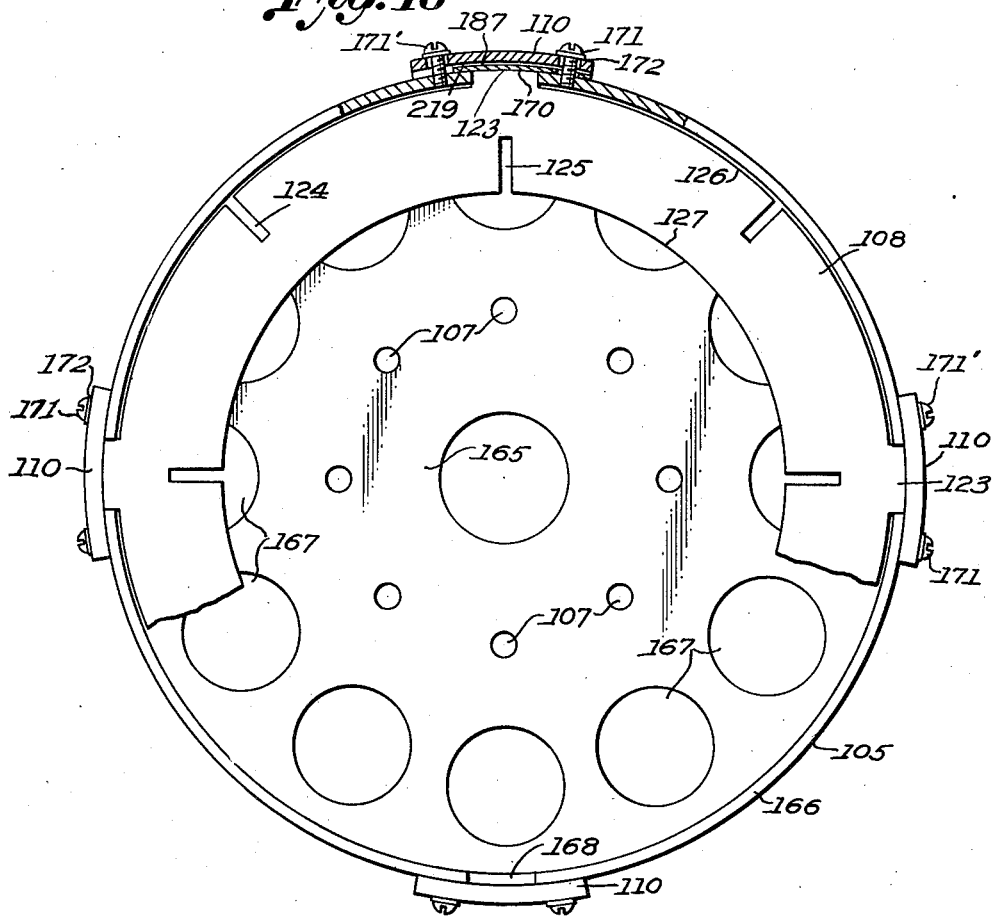

Figure 18 (sheet 7) is a front view of the dust plate with only the brake disk positioned therein, parts of the braking disk and of the dust plate being broken away for the purpose of clearness.

Figure 19:
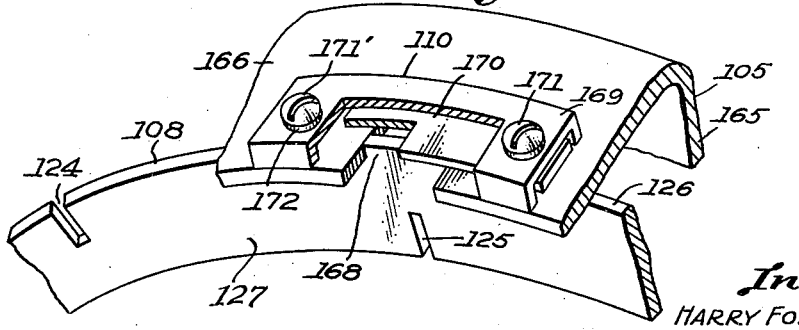

Figure 19 (sheet 7) is a perspective view of a fragment of the dust plate and brake disk shown in Figure 16 taken in the vicinity of one of the anti-rattle springs. Parts of the spring and spring casing have been broken away for the purpose of more clearly showing the structure of the same.

Figure 20:
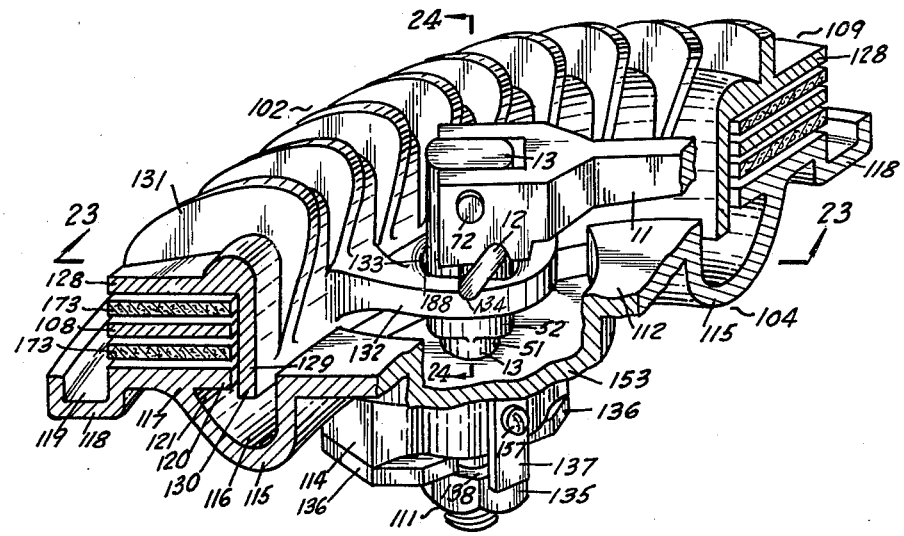

Figure 20 (sheet 8) is a perspective view of a fragment of my brake shown in Figure 14 with the dust plate removed.

Figure 21:
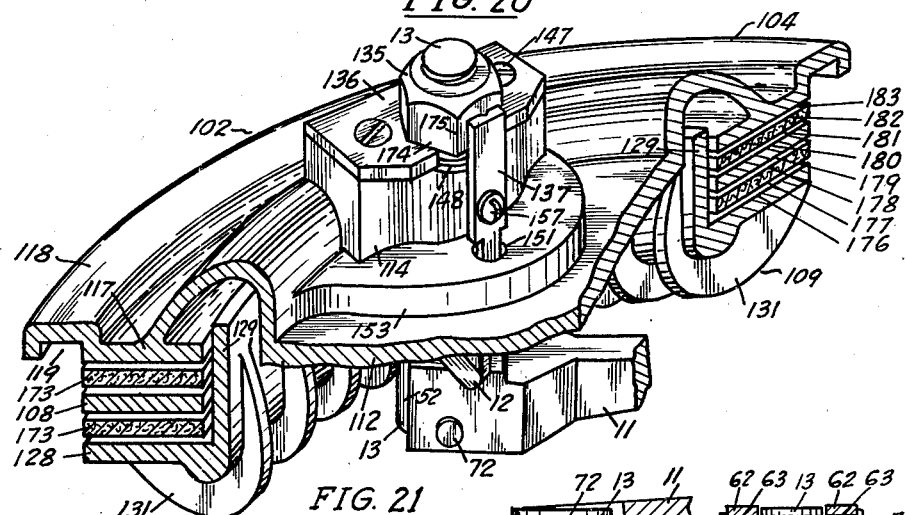

Figure 21 (sheet 8) is a perspective view of the fragment of my brake shown in Figure 20 as it appears when viewed from the side opposite to that from which Figure 20 was taken.

Figure 22:
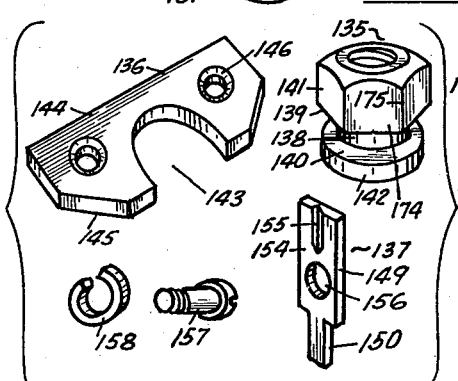

Figure 22 (sheet 8) is a perspective view of each of those elements which together constitute the spacing or adjusting means for and automatic clearance determinant of the brake shown in Figures 14 to 24 inclusive.

Figures 23, 24:
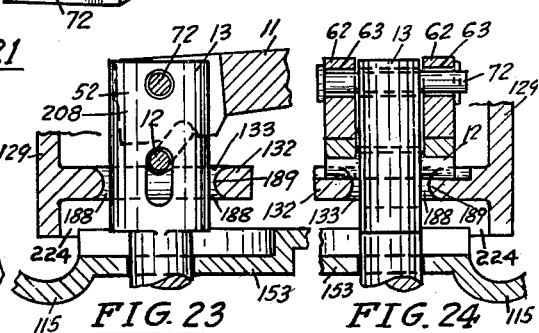

Figure 23 (sheet 8) is a section of a fragment taken along the line 23—23 of Figure 20.

Figure 24 (sheet 8) is a section of a fragment taken along the line 24—24 of Figure 20.

Figure 25 (sheet 9) is a side view partly in section of a modified form of my improved brake unit wherein the dust plate is an integral part of the wheel with which the brake is associated. Parts of the tire have been broken away in order to permit the showing of the wheel on as large a scale as possible.

Figure 26 (sheet 9) is a front view of that fragment of the unit shown in Figure 25 which falls between the arrows 26—26. The hub cap has been removed in order to show otherwise hidden parts.

Referring more particularly to Figures 1 to 13 of the drawings, reference numeral 1 denotes my improved brake as a unit which is composed of a primary brake section 2 adapted to be connected to an axle flange of an automobile (not shown) by means of bolts (not shown) extending through suitable apertures 3 formed in the backing plate 4 of my main brake portion 2 and a dust plate 5 attached to the automobile wheel (not shown) by bolts 6 extending through suitable apertures 6' formed in the said dust plate. The attachment of the backing plate 4 to the axle flange and of the dust plate 5 to the wheel is made in the same manner which is now practised in the art. This is and of itself does not constitute a part of my invention and for that reason will not be further described here.

The main brake portion 2 is composed of the said backing plate 4, a cast iron brake shoe 7, a brake disk 8, a clamping ring 9, a cast iron brake shoe 10, two lever arms 11, a fulcrum arm 12 associated with each lever arm 11, an anchor pin 13 associated with each lever arm 11, and a compensating link 14 associated with the said lever arms 11.

The backing plate 4 is composed of a main body portion 15, having the groove 21 formed therein, a U-shaped bridge portion 16 defining and forming the groove 17, the annular centralizing lug 18 and the bearing portion 19 which terminates in the flange 20. The backing plate 4 has attached thereto by means of the screws 22 the cast iron braking ring 7. For further strengthening the bond between the braking ring 7 and the backing plate 4 against rotary motion relative to each other the backing plate 4 is provided with a plurality of lugs 23 which extend into suitable slots 24 formed in the cast iron braking ring 7. The said cast iron braking ring 7 has formed thereon the annular centralizing lug 25 which cooperates with the centralizing lug 18 on the backing plate 4 to properly position the cast iron braking ring 7 upon the backing plate and in providing a contact and bearing surface between the said elements 4 and 7 as is clearly shown in Figures 3, 5 and 8.

Figures 2, 3, 4, 5:
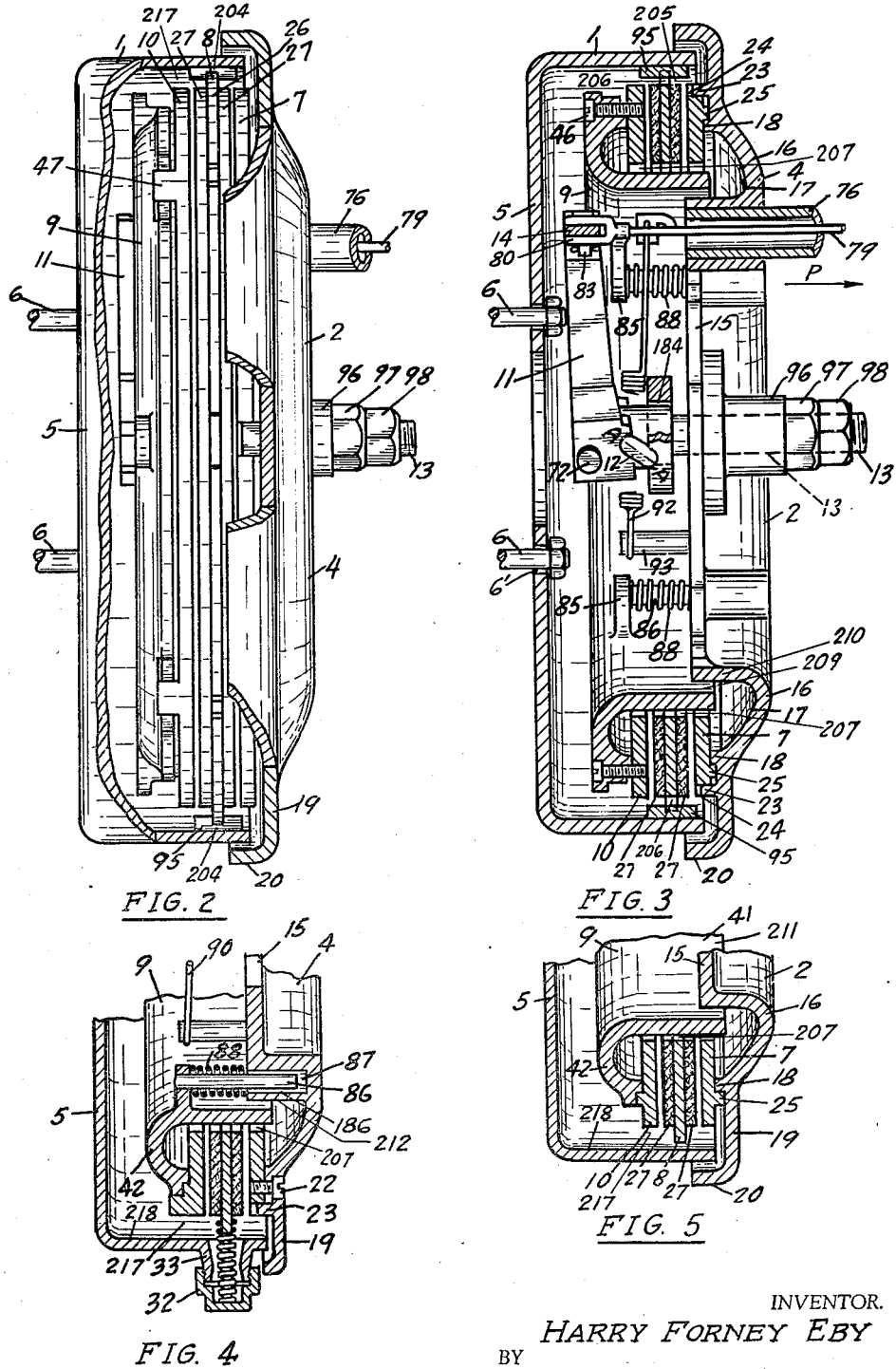
Figure 2 (sheet 2) is a side view showing the brake attached to the dust plate of the wheel. Parts of the dust plate and the backing plate are shown broken away for the purpose of clearance. (It is to be noted that in brakes now in general use the dust plate is the brake drum.)
Figure 3 (sheet 2) is a section taken along the line 3—3 of Figure 1 with the dust plate attached thereto.
Figure 4 (sheet 2) is a section taken along the line 4—4 of Figure 1 with the dust plate attached thereto.
Figure 5 (sheet 2) is a section taken along the line 5—5 of Figure 1 with the dust plate attached thereto.

The revolving brake ring 8 is composed of a central bearing member 26 to which is attached the ring-like brake lining elements 27—27. The external diameter of the central bearing member 26 is substantially less than the internal diameter of the dust plate 5. This results in a substantial amount of clearance 204 between the external peripheral surface of the central bearing member 26 and the internal surface of the dust plate 5. The member 26 has a plurality of fingers 28 formed thereon which serve to receive and hold one end of the anti-rattle springs 29, the other end of which terminates within the cup members 30 carried by the dust plate 5. The cup members 30 may be externally threaded at their mouths for attachment to the internally threaded collars 31 formed on the dust plate 5 as shown in Figures 6 and 7 or may be internally threaded members 32 for attachment to the externally threaded collars 33 formed on the plate 5 as shown in Figure 4. The portion 26 has formed therein a plurality of slots 94 which are adapted to receive the lugs 95 formed on the inner surface of the dust plate 5 for locking the said dust plate and the wheel which it carries to the said member 26. The external diameter of the elements 27—27 and the height of each lug 95 are such that a substantial amount of clearance 205 exists between the external peripheral surfaces of the elements 27—27 and the upper surface of the lugs 95. The upper edge of each of the slots 94 is substantially at the external peripheral edge of the elements 27—27. There is therefore a substantial amount of clearance 206 between the upper edge of each of the slots 94 and the upper edge of each of the lugs 95.

One of the many possible equivalents for the anti-rattle spring structure 29 shown in Figures 4, 6 and 7 and hereinabove discussed is shown in Figure 13. In this structure the dust plate 5' has a slot 34 formed therein which is covered by the channeled cap 35. A spring 36 is positioned over the said slot and within the said cap so that it has one of its ends 37 anchored as shown at 38 and the other of its ends free as at 39 and its body portion 40 curved downwardly so that it will normally bear against the element 26 of the rotating disk 8.

The clamping ring 9 (see particularly Figures 8, 5, 4 and 3) is an anular member composed of the downwardly extending flange 41 terminating at its upper end in the inverse U bridge member 42, which in turn terminates in the lip portion 43 having the annular centralizing lug 44 formed thereon. The annular lug 44 cooperates with a similar lug 45 formed on the annular cast iron brake shoe member 10 for properly positioning the annular cast iron brake shoe member 10 upon the member 9 and for furnishing a bearing and contact surface between the members 10 and 9 as is clearly shown in Figures 4, 5 and 8. The annular cast iron brake shoe member 10 is attached to the clamping ring 9 by means of suitable screws 46 and held against rotary motion relative to the member 9 by means of the lugs 47 formed on the annular cast iron brake shoe member 10 which extend into suitable slots formed in the lugs 213 extending from the lip portion 43 of the member 9. The clamping ring 9 has further formed thereon two lugs 48 each of which has a groove 49 and a slot 50 formed therein. The outer face 214 of the lug 47 is in the same plane with the outer face 215 of the lug 213. And both faces 214 and 215 are in the same plane as the outer peripheral surface 216 of the cast iron brake shoe member 10. The external diameter of the annular cast iron brake and shoe member 10 is substantially less than the internal diameter of the dust plate 5. This results in a substantial amount of clearance 217 between the outer peripheral surface 216 of the annular cast iron brake and shoe member 10 and the inner peripheral surface 218 of the dust plate 5. The internal diameter of the annular cast iron brake shoe member 10 is equal to the internal diameter of the cast iron brake ring 7, of the bearing member 26 of the revolving brake ring 8, and of the ring-like brake lining elements 27—27. The external diameter of the downwardly extending flange 41 of the clamping ring 9 is substantially less than the internal diameter of the members 7, 10, 26 and 27—27. This results in a substantial amount of clearance 207 between the external surface of the flange 41 and the internal peripheral surfaces of the members 7, 10, 26 and 27—27. The internal diameter of the downwardly extending flange 41 of the clamping ring 9 is substantially greater than the external diameter of the wall 210 of the U-shaped bridge portion 16 of the backing plate 4. This results in a substantial amount of clearance 209 between the surface 211 of the flange 41 and the surface 212 of the wall 210.

Each of the anchor pins 13 is composed of a cylindrical portion 51 terminating at its lower end in a threaded portion 53 and at its upper end in the oblong member 52. The cylindrical portion 51 of each pin 13 is formed for being received in and for extending through a suitable bore formed in a boss 96 which is formed on the portion 15 of the backing plate 4. The oblong member 52 of each of the anchor pins 13 is formed for being freely received within the slot 50 and is so proportioned that a substantial clearance 184 exists between the outer surface 208 of the oblong member 52 and the inner surface 185 of the slot 50. The portion 52 has formed therein a slot 54 and an aperture 55.

Each of the fulcrum arms 12 is U-shaped in cross-section being composed of a central portion 56 and two arms 57—57. The upper and lower ends 58 of each of the said arms 57—57 are semicircular in cross-section.

Figure 8:
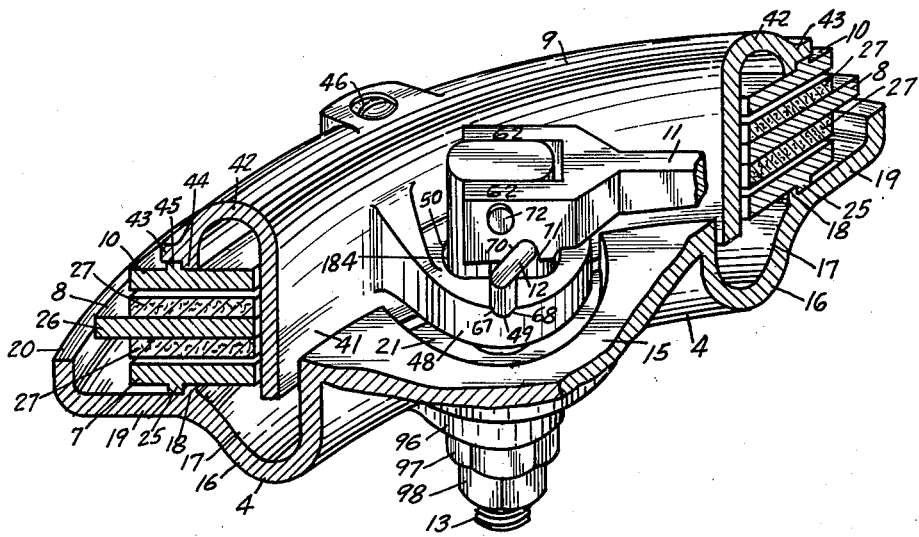
Figure 8 (sheet 4) is a perspective view showing a fragment of my brake device with the dust plate removed. Parts of the device are shown in section and other parts are shown broken away for the purpose of clearances.
Figure 9:
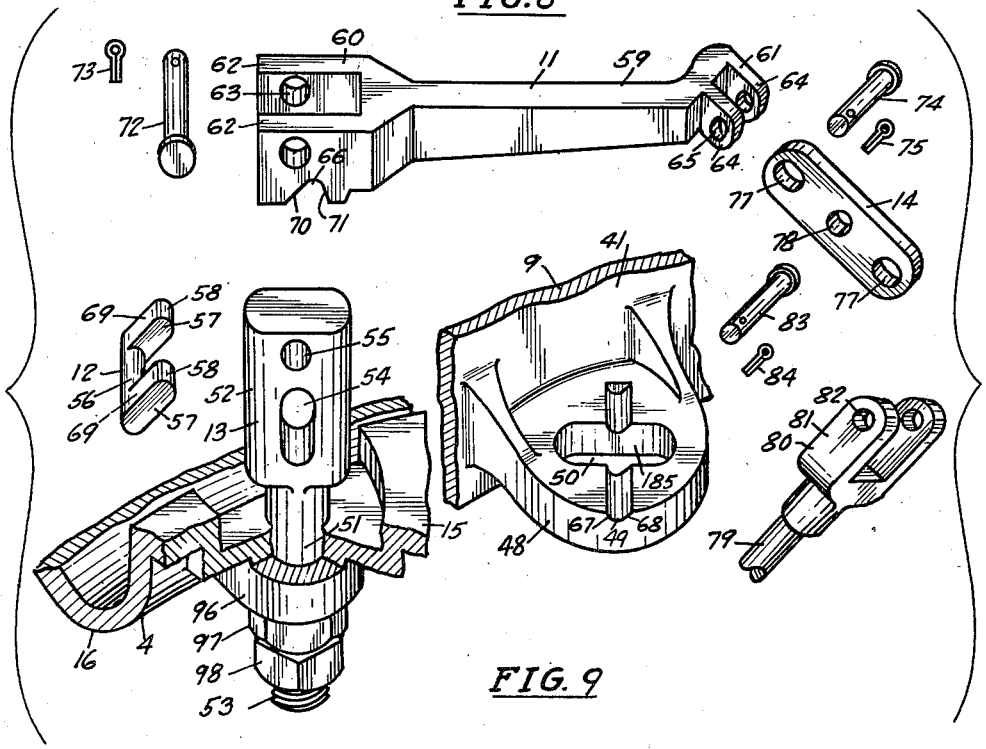
Figure 9 (sheet 4) is a perspective view showing the component elements which together form the lever arm structure and fragments of the backing plate and clamping ring which are associated with and form bearing members for the said lever arm structure.

Each of the lever arms 11 is composed of a main body portion 59 terminating at each of its ends in the bifurcated portions 60 and 61 respectively. Each of the arms 62 of the bifurcated portion 60 has an aperture 63 formed therein and each of the arms 64 of the bifurcated portion 61 has an aperture 65 formed therein. Each of the arms 62 further has formed therein a groove 66 which in shape is complementary to the groove 49 formed in the lug 48 of the clamping ring 9. The shape of the groove 49 is such that its face 67 which is to the left of a center line drawn through the said groove as shown in Figures 8 and 9 and is of the same radius as that of the semi-circle which serves to form and bound the ends 58 of the arms 57 of the member 12 while the face 68 is the straight line which is formed by the faces 69 of the arms 57 of the member 12 when the said fulcrum arm 12 is in the non-applied position of the brake (shown clearly in Figures 3 and 8). The face 70 of the groove 66 is parallel to and of the same form as the face 68 of the groove 49 and the face 71 of the groove 66 is parallel to and the same form as the face 67 of the groove 49. A pintle 72 extends through the apertures 63 formed in the arms 62 of the bifurcated portion 60 of each of the lever arms 11 and through the aperture 55 formed in the portion 52 of the anchor pin 13 for the purpose of attaching the end 60 of each of the arms 11 to the said anchor pin 13. A cotter pin 73 extends through a suitable aperture formed near an end of the pintle 72 for latching said pintle in place. A pintle 74 extends through each of the apertures 65 formed in the arms 64 of the bifurcated portion 61 of each of the lever arms 11 and through the oblong slot 77 formed in the compensating arm 14 for the purpose of attaching each of the said ends 61 to the said compensating arm 14. A cotter pin 75 extends through a suitable aperture formed near an end of the pintle 74 for latching said pintle in place. The said compensating arm 14 has further formed therein an aperture 78 which is positioned for registering with apertures 82 formed in the arms 81 of the end 80 of the cable 79 and for receiving the pintle 83 and cotter pin 84 which lock the said end 80 of the cable 79 to the said compensating arm 14.

The said flange 41 further has formed thereon the lugs 85 in each of which is anchored the pins 86—86. One of the ends of each of the pins 86 extends into a suitable groove 87 formed in the backing plate 4 (see Figures 1, 3 and 4). The diameter of each of the pins 86 is substantially less than the diameter of each of the grooves 87. This results in a substantial clearance 186 between the outer surface of each pin 86 and the inner surface of the groove 87 which receives said pin. Each pin 86 serves as a guide member for the springs 88 which normally serve to urge the clamping ring 9 away from the backing plate 4 and keep the brake in its unapplied position (clearly shown in Figures 2, 3, 4, 8 and by the full lines in Figure 10).

The clamping ring 9 further has formed thereon lugs 89 which have suitable apertures formed therein for receiving an end 91 of the anti-rattle springs 90 and the other end 92 of which is anchored around the post 93 carried by the portion 15 of the backing plate 4. (See Figures 1 and 4.)

Although the manner of assembly, mounting and operation of the brake here shown and described is believed to be obvious from the foregoing disclosure, yet for the purpose of obviating any possible misunderstanding the following detailed description is here given.

Let it be assumed that all of the component parts of my improved brake have been formed and are at hand. We can then proceed as follows: The annular cast iron brake shoe 7 is properly positioned upon the backing plate 4 and attached thereto by means of the screws 22. The annular cast iron brake shoe 10 is properly positioned upon the annular clamping ring 9 and attached thereto by means of the screws 46. The rotating brake disk 8 is then mounted upon the clamping ring 9 to take the position shown in Figure 3 wherein the downwardly extending flange 41 of the member 9 extends through the aperture in the annular member 8. The springs 88 are then positioned upon the posts 86 and the clamping plate placed upon the ensemble of the members 9, 10 and 8 so that the posts 86 are received within the grooves 87 formed in the backing plate 4. The anti-rattle springs 90 are now placed in position. Thereafter, the anchor pin 13 is inserted through the slot 50 in the lug 48 and through suitable formed apertures in the boss 96 formed on the portion 15 of the clamping ring 9 so that it assumes the position shown in the assembly in Figure 8. The fulcrum arm 12 is then inserted through the aperture 54 formed in the portion 52 of the anchor pin 13 and the lever arm 11 is then positioned upon the portion 52 of the anchor pin 13 to assume the position shown in Figure 8 wherein the head of the portion 52 is received within the arms 62 of the bifurcated portion 60 of the lever arm 11. The pintle 72 is then inserted through the registering apertures 55 and 63 on the portions 52 and 62 respectively and locked in place by the cotter pin 73. The nuts 97—98 (see Figures 3, 8 and 9) are then actuated so that the anchor pin 13 is forced downwardly and is locked in the position shown in Figures 3, 8 and 10 wherein one of the ends 58 of the arms 57 of the fulcrum arm 12 is received within the slot 49 and the other of the ends 58 of the said arms 57 of the fulcrum arm 12 is received in the slot 66 formed in the arms 62 of the lever arm 11. The compensating arm 14 is now positioned so that its ends are received within the arms 64 of the bifurcated portion 61 of the arm 11 and that the apertures 77 register with the apertures 65 formed in each of the said arms 64. The pintle 74 is then inserted through the registering apertures 65—77 and locked in position by means of the cotter pin 75. The assembled brake unit 2, consisting of the members 4, 7, 8, 9, 10, 11, 12, 13 and 14 and the springs as well as other associated elements carried thereby, is now placed upon the axle and attached thereto by means of suitable bolts (not shown) extending through the apertures 3 formed in the portion 15 of the backing plate 4. The manner of mounting the backing plate and the brake unit which it carries upon the axle is well known in the art for that reason will not be here further discussed.

The bifurcated end 80 of the cable 79 which extends through a suitable sheath 76 having one of its ends positioned in a suitable aperture formed in the backing plate 4 is then positioned so that the apertures 82 in the arms 81 register with the aperture 78 in the compensating arm 14 and is locked in this position by means of the pintle 83 and the cotter pin 84. The dust plate 5 and the wheel which is attached to it is now mounted upon the ensemble 2 of the brake portion 1 so that the lugs or fingers 95 are received within the slots 94 formed in the revolving brake ring 8. The springs 29 are now placed in position upon the fingers 28 and the cap 30 placed upon the collar 31. Or, in the event that the modification of Figure 4 is used, the cap 32 is placed upon the collar 33. Or, in the event that the modification shown in Figure 11 is used, the spring 36 and the cap 35 are placed in position upon the portion 5'. The nuts 97 and 98 are now rotated so that the faces of the brake linings 27—27 and of the cast iron brake shoes 7 and 10 contact with each other. The nuts 97 and 98 are now turned backward a distance sufficient to just insure that the faces of the elements 28, 7 and 10 respectively cannot contact with each other. The brake is now properly adjusted.

It is to be noted that when the brake is in the adjusted position the fulcrum arm 12 occupies the position shown by the full lines in Figures 3, 8 and 10 wherein its vertical center line A—A falls to the right and forms an acute angle with the axis of the anchor pin 13. When the brake is applied by manipulation on the brake pedal (not shown) pressure is exerted on the cable 79 in the direction of the arrow P shown in Figure 3. This pulls the lever arm 11 in the said direction P (see Figures 3 and 10), causing said lever arm 11 to assume the position shown by the dot and dash lines in Figure 10. The fulcrum arm 12 rotates in a counter-clockwise direction, decreasing the angle between the center line A—A and the line represented by the axis of the anchor pin. It is to be further noted that when the fulcrum arm 12 is in the maximum brake applied position the center line A—A has not rotated past the line represented by the longitudinal axis of the anchor pin 13. This structure insures the return of the lever arm 11 to its proper position after the foot pedal is released and the brakes are disengaged.

It is further to be noted that by means of my anchor pin 13 I am enabled to use brake lining of any thickness for the elements 27, it being only necessary to actuate the nuts 97 and 98 so that the anchor pin 13 is locked in the position made necessary by the thickness of the brake lining 27 used. It is further to be noted that with my structure it has become possible to place brake lining upon the faces of the cast iron braking disks 7 and 10 respectively which contact with the elements 27—27.

It is further to be noted that when my brake unit 2 is fully assembled the points B and C representing the center of the portion 52 of the anchor pin 13 and the central point where the pintle 72 extends through the arms 64 of the lever 11 fall on the same straight line, thus preventing torque in the said arms 11 resulting from pressure produced because of force applied to the cable 79. The elongated slots 77 permit relative motion between the arms 11 and the compensating arm 14 made necessary as the result of relative movement of the said compensating arm 14 of the lever arms 11 resulting from pressure applied upon the cable 79.

It is further to be noted that because of the provision of the compensating arm 14 in association with the lever arms 11, as shown, pressure applied upon the cable 79 is automatically equalized through the brake member when the brake is applied. For, let it be assumed that the brake has been so adjusted that the faces of the brake member near the left lever arm 11 are closer together than the faces of the portions 7, 10 and 27 near the right hand lever arm 11. Pressure upon the foot pedal tending to actuate the cable 79 in the direction of the arrow P will result in equal movement of both halves of the compensating arm 14 with the pintle 83 as the center of application. When the left hand portion of the arm 14 reaches a position wherein that portion of the members 7, 10 and 27 which are near the left hand lever arm 11 are in contact, the right hand portion of said arm 14 will still have room for forward motion because of the fact that the portion of the elements 7, 10 and 27 closest to the right hand lever arm 11 are not as yet in contact. The arm 14 will then move forward in the line of least resistance around the pintle 83 as a fulcrum until the portion of the brake elements 7, 10 and 27 closest to the arms 14 are also in contact. It is particularly to be noted that continued movement of the brake element 10 without binding during this entire operation is made possible by the clearances 184, 186, 207, 209 and 217. Continued movement of the elements 27—26—27 without binding during this entire operation is made possible by the clearances 204, 205, 206 and 207. Thereafter, the arm 14 will again move forward in a straight line with the pintle 83 as the point of application with equal pressure resulting at each of the fulcrum arms 12. It is obvious that to get equal pressure in the compensating arm 14 the distance from the center line of the aperture 78 to the centers of each of the apertures 77 must be equal as shown at D in Figure 1. I have also found that my novel structure will automatically compensate for differences in brake adjustment in two or more of brakes of a connected brake unit and as a result uniform brake pressure is obtained at all of the brakes of the unit.

The unit shown in Figures 14 to 24 differs from that shown in Figures 1 to 13 in the following major particulars:

(a) The movable and stationary clamping disks are each integral units instead of being two pieces joined together by screws.

(b) The movable clamping disk has been provided with a plurality of diagonally disposed fins which serve to facilitate the radiation of the heat resultant from the braking action and to impart greater strength to the disk.

(c) The brake lining is merely positioned (floated) between the movable clamping disk, the brake disk and the stationary clamping disk and not attached to any one of these elements. As a result both faces of the brake lining function to produce deceleration.

(d) The nuts which are mounted on the anchor pins are so formed that they perform the triple function of serving as nuts, as spacing and adjusting means for the brake elements, and as automatic clearance determinants for the brake elements.

(e) The brake disk has a plurality of slots formed therein for the purpose of reducing to a minimum the tendency of the disk to warp when subjected to the forces of contraction and expansion.

(f) Certain elements such as the anti-rattle springs 90 and their associated parts have been eliminated.

Referring more particularly to the said Figures 14 to 24, reference numeral 101 refers to the brake as a unit which is composed of a primary brake section 102 adapted to be connected to the axle A of an automobile in the usual manner by means of suitable bolts (not shown) extending through the apertures 103 formed in the backing plate or stationary disk 104 and a dust plate 105 attached to the wheel W of an automobile by means of suitable bolts 106 extending through the apertures 107 formed in the said dust plate. The attachment of the backing plate 104 to the axle flange and of the dust plate 105 to the wheel is made in the same manner now practised in the art. Since this attachment in and of itself does not constitute a part of my invention, it will not be here further described.

The main brake portion 102 is composed of the said backing plate or stationary disk 104, the annular brake disk 108, the annular clamping ring or movable disk 109, the brake linings 173, the anti-rattle element 110, the two lever arms 11, a fulcrum arm 12 associated with each lever arm 11, an anchor pin 13 associated with each lever arm 11, a compensating link 14 associated with the said lever arms 11, and a spacing, adjusting and automatic clearance determining unit 111.

The lever arms 11, the fulcrum arms 12, the anchor pins 13, and the compensating link 14 have been fully described in the discussion of Figures 1 to 13 inclusive and for that reason will not be here further described.

The backing plate 104 (see Figures 15, 16, 17, 20, and 21) consists of a main body portion 112 having two grooves 113 formed therein, the two bosses 114 formed thereon, an annular U-shaped bridge portion 115 defining and forming the groove 116, the annular brake contacting portion 117, and the outer U-shaped ring 118 defining and forming the groove 119. It is to be noted that the brake contacting portion 117 is so formed that a portion 120 thereof extends over the groove 116 and combines with the walls of the said groove to form a pocket 121 for any water, grease, or dirt which may find its way into the groove and with the apron 129 of the movable disk 109 to form a shield or cover which prevents foreign elements falling along the apron from entering or falling between the braking surfaces. The bridge portion 115 has a suitable aperture 122 formed therein in the lower part thereof which permits the discharge of any foreign substance which finds its way into the pocket 121.

The revolving brake disk 108 (see Figures 14, 15, 16, 17, 18, 19, 20 and 21) is a flat annular ring having a plurality of dust plate engaging fingers 123 formed thereon and two series of radial slots 124 and 125 formed therein and extending from the outer and inner peripheries 126 and 127 respectively. The slots 124 are staggered with respect to the slots 125 as shown. The slots 124 and 125 serve to prevent warping of the brake disk 108 when it is subject to expansive and contractive forces.

The clamping ring or movable disk 109 (see Figures 14, 16, 17, 20 and 21) is an annular member substantially L-shaped in cross-section the vertical arm 128 of which constitutes a brake forming surface and the horizontal arm 129 of which constitutes an apron the free end 130 of which extends into the groove 116 formed in the backing plate 104 as shown. The arms 128 and 129 also form walls which serve to prevent foreign substances from entering between the brake forming surfaces. The arms 128 and 129 have a plurality of angularly disposed ribs 131 formed thereon which serve the twofold purpose of reinforcing the clamping disk 104 and of more rapidly dissipating the heat generated in braking. The ribs 131 are so formed that any radius of the disk 104 will cut at least two ribs. This structure imparts greater strength to the ensemble and serves to insure the even distribution of the braking pressure. The arm 129 has extending outwardly therefrom the two lugs 132 each of which has the slot 133 and the groove 134 formed therein. The slot 133 and the groove 134 are exactly like the slot 50 and groove 49 respectively and serve exactly the same purpose. The slot 133 is so formed that a substantial amount of clearance 188 exists between the inner surface 189 of the slot 133 and the outer surface 208 of the oblong member 52 of the anchor pin 13. The arm 129 has also extending therefrom the four spaced lugs 159 in each of which is anchored a guide pin 160 the lower end 161 of which is received in a socket 162 formed in a boss 163 formed on the stationary plate 104. The diameter of the socket 162 is substantially greater than the diameter of the pin 160. As a result a substantial amount of clearance 221 exists between the outer surface of the pin 160 and the wall of the socket 162. Each pin 160 has mounted thereon a spring 164 which normally serves to urge the clamping ring 109 away from the backing plate 104 and to keep the plate in its unapplied position.

Each spacing, adjusting and automatic clearance determining unit 111 (see Figures 15, 16, 17, 20, 21 and 22) consists of the anchor pin 13, the nut 135, the boss 114, the anchor plate 136, and the leaf spring detent 137.

Each nut 135 has a groove 138 formed therein near the lower end thereof with the walls 139 and 140 of the groove forming shoulders for the upper and lower portions 141 and 142 respectively of the said nut.

Each anchor plate 136 has a substantially hemispherical slot 143 formed therein which permits the same to fit into the groove 138. In this position the upper and lower surfaces 144 and 145, respectively, of the anchor plate 136 contact the shoulders 139 and 140, respectively, as shown. The anchor plate 136 has further formed therein the countersunk apertures 146 which receive suitable screws 147 which extend into suitably threaded apertures formed in the boss 114. The boss 114 has further formed therein a suitable groove 148 which receives the lower portion 142 of the nut 135.

Each detent 137 consists of a main body member 149 which terminates at its lower end in the finger 150 which is received within a suitable aperture 151 formed in the boss 153 formed on the stationary disk 104. The inner face 154 of the main body member 149 of each detent 137 has a groove 155 formed therein. The main body member 149 of each detent 137 has further formed therein the aperture 156 through which the screw 157 extends. The screw 157 has the lock-washer 158 mounted thereon as shown and extends into a suitable threaded aperture formed in the boss 114.

The dust plate 105 consists of a back portion 165 and a flange portion 166. The back portion 165 has a plurality of apertures 167 formed therein which permit a still better radiation of the heat generated in braking. The flange portion 166 has formed therein the slots 168 which receive the fingers 123 of the braking disk 108.

Mounted on the flange portion 166 of the dust plate 105 so as to overlie the fingers 123 of the braking disk 108 are the anti-rattle elements 110 consisting of the channel members 169 each of which houses a leaf spring 170 which serve to prevent rattling of the revolving disk. The channel members 169 and the leaf spring 170 are held in position by means of the screws 171 which extend through suitable lock-washers 172, thence through the apertures formed in the members 169 and 170 and finally into a suitable threaded aperture formed in the flange portion 166. The height of each of the fingers 123 is such and the ceiling 187 of each of the channel members 169 is so positioned that a substantial amount of clearance 219 exists between the upper surface of each of the leaf springs 170 and the ceiling 187 of each of the channel members 169. It is to be noted that the annular brake disk 108, the annular clamping ring or movable disk 109, and the brake linings 173 are so formed that a substantial amount of clearance 222 exists between their respective outer peripheral surfaces and the inner surface of the dust plate 105. Further, a substantial amount of clearance 223 exists between the inner peripheral surfaces of the elements 173, 108, 173 and the outer peripheral surface of the apron 129. Further, a substantial amount of clearance 224 exists between the inner peripheral surface of the lower portion of apron 129 and the outer peripheral surface of the wall 225 of the inverse U bridge 115. These clearances 222, 223, 224, the clearance 188, the clearance 219, and the clearance 221 make it possible for the brake disk 108, the movable disk 109, and the brake linings 173, to move without binding during the entire period in which the brakes are being applied and at the same time permit the component elements of the brake to make such of the adjustments relatively to each other hereinabove specified in the detailed discussion of the operation of the modification shown in Figures 1 to 13 as may be necessary.

The manner of assembly, mounting and operation of the brake here shown and described is believed to be obvious from the foregoing disclosure yet for the purpose of obviating any possible misunderstanding the following detailed description is here given.

Let it be assumed that all the component parts of my improved brake have been formed and are at hand. We can then proceed as follows:

The anchor pin 13 is first inserted in the hole in the boss 114 formed on the plate 104. Then the nuts 135 are positioned upon the anchor pin 13. Then the anchor plate 136 is positioned upon the nut as shown in Figures 20 and 21. Then the detent is positioned as shown in said Figures 20 and 21. Then the plate 104 is attached to the axle A by means of nuts extending through the apertures 103 in the manner well known in the art.

The annular brake lining 173 is placed upon the inner surface 176 of the arm 128 of the movable clamping disk 109, then the braking disk 108 is positioned upon the brake lining 173, then another brake lining 173 is positioned upon the braking disk 108, then the springs 164 are positioned upon the guide-pins 160, and then this assembly is positioned so that the elliptical end 52 of the anchor pin 13 extends through the slot 133 formed in the lug 132 as shown in Figures 17 and 20. Then the arms 11 are loosely positioned over the anchor pins 13 and then the fulcrum arms 12 are inserted into the slots 54 formed in the anchor pin 13 (see Figure 9) so that their lower edges rest in the groove 134 as shown in Figure 20. Then the arms 11 are secured in position by inserting the pintles 72 through the proper apertures in the bifurcated arms 62 of the lever arm 11 and the portion 52 of the anchor pin 13, as shown in Figure 20, and fastening the same by means of the cotter pin 73. Then the bifurcated end of the cable 79 is attached to the compensating link 14 by means of the pintle 83 and cotter pin 84. Then the compensating arm 14 is positioned so that its ends are within the bifurcated arms 64 formed on the lever arms 11 and attached thereto by means of the pintles 74 and cotter pin 75. Then the dust plate 105 is attached to the wheel and the wheel and dust plate are mounted on the axle and positioned so that the fingers 123 of the brake disk 108 are received in the slots 168 of the dust plate. Then the wheel is fastened against lateral displacement on the axle by means of a nut (not shown) in the manner now well known in the art. The screws 171 of the anti-rattle unit are now tightened to give the springs 170 the necessary tension to prevent them from rattling.

The brake may be adjusted in the following manner either before or after the dust plate is attached. The nuts 135 are turned until the braking elements 128, 173, 108, 173 and 117 contact. In this position, the face 176 of the arm 128 contacts the face 177 of the element 173; the face 178 of the elements 173 contacts the face 179 of the element 108; the face 180 of the element 108 contacts the surface 181 of the element 173; and the face 182 of the element 173 contacts the face 183 of the element 117. Then the nut is turned backwards. Since the nut is hexagonal upon each one-twelfth of a revolution of the same, either one of its flat faces 174 will contact the inner face 154 of the detent 137 or one of its edges 175 will be received in the slot 155 formed in the said detent. Since the pitch of the nut and thread are known the distance which the nut travels in one-twelfth of a revolution can easily be calculated and in this case would be equal to one-twelfth of the pitch. (If the nut were an octagon the alternate faces and edges would contact the face and slot respectively of the detent at each sixteenth of a revolution, if decagon each twentieth of a revolution, etc. This follows the well known mathematical rules.) The total play or distance between the brake elements is equal to the number of backward turns from the fully compressed or absolute contacting position. If five-twelfths of a backward turn is taken then the total play between the braking elements would be five times one-twelfth of the pitch. Assuming that the pitch is .05″, then the total play between the brake elements at this point in the adjustment is $$5 \times .05 = \frac{.25}{12} = .02''$$

Since we must assume that this clearance is evenly distributed between the component brake elements then the clearance between any two adjacent surfaces is one-fourth of the total clearance or $\frac{1}{4} \times .02'' = .005''$. It is believed to be obvious from the foregoing discussion that my nut 135, detent 137 and associated elements combine to form a spacing, adjusting, and automatic clearance determinant unit. In addition, the nut serves to bind the disks and other elements of the main brake portion 102 together.

The unit 190 shown in Figures 25 and 26 differs from that shown in Figures 14 to 24 in the fact that the dust plate forms an integral part of the wheel 191. In this structure, the felly 193 of the wheel 191 and the plate 195 which is attached to the felly 193 by means of the rivets 194 is the equivalent of the dust plate 105. The brake disk 108 is keyed to the felly 193 by means of the lugs 203 which extend through suitable slots formed in the brake disk 108. (The lug 203 and slot structure aforesaid are exactly the same in structure and function in exactly the same manner as the lug 95 and the slot 94 shown in Figures 1 to 13.) The plate 195 is attached to the disk-like portion of the cone 196 by means of the bolts 197 and nuts 198. (The bolts extend through the registering apertures 199 and 200 formed in the plate 195 and in the disk-like portion of the cone 196 respectively.) The cone is keyed to the bolt 202 by the key 220 and secured upon said bolt 202 by the nut 201.

The following are some of the many advantages resulting from my novel structure:

As a direct result of my bridge structure, uniform brake pressure at all points upon the brake is obtained and distortion of the metal of the backing plate and clamping ring is prevented. The fins serve to impart strength to the clamping plate and to more rapidly dissipate the heat due to braking. Uniform application of the brake is obtained and differences in the adjustment of the brake is compensated for by my compensating arm structure. The clearance hereinabove specified between the brake elements makes it possible for the elements of the brake to adjust themselves and exert uniform pressure without binding in response to the activation of the compensating arm structure. Different thicknesses of brake lining can be used because of the structure of my anchor pin and associated parts. Comparatively soft braking surfaces can be used because of the greater braking area provided which results in a reduction of the pressure necessary to give a certain decelerating action. Cast iron braking disks may be used thus utilizing the metal which can absorb the greatest amount of heat without fusion or distortion. Full flat braking surface contact always results because of the mounting of one of the brake members so that it is free to move in a plurality of planes. Uniform braking pressure is obtained no matter whether the brake pedals travel a short distance, as when the brake lining is new, or a comparatively long distance, as when the brake lining is old. Because of my structure, the brake can always be adjusted by practically any person and does not need the services of an exceptionally skilled mechanic. The clearance between the braking elements can be determined without the use of feelers and calipers because of my novel spacing, adjusting and clearance determining nut and its associated parts. By the use of free floating brake linings the greatest possible area of the brake lining is made available for braking purposes. By arranging the braking elements as shown in Figures 1 to 26 the braking surfaces are given the maximum possible protection against the entry of foreign elements between the braking surfaces. Further, any foreign elements which would find their way around the open ends of the protective walls would be thrown out from between the braking surfaces by the action of centrifugal force during the normal operation of the car. As a direct result of this structure, I am able to cut holes in the drum thereby permitting a more rapid radiation of the heat due to braking.

All of the above disclosure is to be understood as being by the way of illustration only and not by the way of limitation since many changes may be made in the devices here disclosed without departing from the spirit of my invention which consists in so forming a brake that the decelerating force is produced by cooperating disk surfaces as distinguished from the peripheral surfaces now in general use, in so suspending one of the brake members that it is free to move in a plurality of planes, in providing self-compensating clamping means for forcing the brake surfaces into operative contact, in providing means for automatically determining the clearance between the braking elements, in providing means for more rapidly dissipating the heat due to braking, and in so forming the braking unit that the possibility of the entry of foreign substances between the braking surfaces and/or of its remaining there if it enters is reduced to a minimum. Structures may so be built which may incorporate some but not all of the novel elements here disclosed or equivalents for such elements. These as well as structures which incorporate all of the parts and functions of the device here disclosed or equivalents for these parts are contemplated by me and for that reason it is my desire that the claims which are hereunto appended for the purpose of defining my invention should be limited only by the prior art.

Having described my invention, what I claim as new and useful is:

1. A brake consisting of a first disc member; a second disc member; a third disc member positioned intermediate said first and second disc members, said third disc member having means formed thereon for attachment to the member which is to be braked and being mounted for horizontal movement in a plurality of planes and for inclination in a plurality of planes with respect to the element which is to be braked; a pair of levers positioned for applying pressure at two diametrically opposite points on said second disc member to cause said second disc member to move toward said first disc member; and a compensating arm pivotally connected at each of its ends to one of said levers.

2. A brake consisting of a first disc member; a second disc member; a third disc member positioned intermediate said first and second disc members, said third disc member having means formed thereon for attachment to the member which is to be braked and being mounted for horizontal movement in a plurality of planes and for inclination in a plurality of planes with respect to the element which is to be braked; a pair of levers positioned for applying pressure at two diametrically opposite points on said second disc member to cause said second disc member to move toward said first disc member; a compensating arm pivotally connected at each of its ends to one of said levers; and actuating means pivotally connected to said compensating arm for actuating said arm.

3. A brake consisting of a base disc member; a second disc member mounted for lateral movement with respect to the said base disc member; and a third disc member positioned intermediate the said first and second disc members and mounted so as to be free to rotate independently of both the said base and second disc members, the said second disc member having an arm formed thereon which extends over the said third and base disc members, the said second disc member having further formed thereon a plurality of angularly disposed fins.

4. A brake consisting of a base disc member; a second disc member mounted for lateral movement with respect to the said base disc member; and a third disc member positioned intermediate the base and second disc members, the said base disc member having a groove formed therein and a flange extending into the said groove and combining with the said groove to form a pocket, the said second disc member having an arm formed thereon which extends over the said third and base disc members and terminates within the said groove formed in the said base disc member.

5. As an article of manufacture a brake consisting of a base disc member; a second disc member carried by the said base disc member and mounted for lateral movement with respect to the said base disc member, each of the said disc members having a bridge portion formed therein; a third disc member positioned intermediate the said base and second disc members and mounted so as to be free to rotate independently of both the said base and second disc members; and means for actuating the second disc member towards the said base disc member for frictional contact with the said third disc member.

6. A brake consisting of a base disc member; a second disc member mounted for movement with respect to the said base disc member; a third disc member intermediate the said base and second disc members, the said third disc member having means formed thereon for engagement with a rotary element to be braked and being mounted for horizontal movement in a plurality of planes and for inclination in a plurality of planes with respect to the said element to be braked; means for actuating the said second disc member towards the said base disc member for contact with the said third disc member; and annular braking lining positioned intermediate the said first and second and second and third disc members but not fastened to any one of the said disc members.

7. As an article of manufacture a brake consisting of a base disc member; a second disc member carried by the said base disc member and mounted for lateral movement with respect to the said base disc member, both the said base and second disc members having a bridge portion formed therein intermediate their respective ends; a third disc member positioned intermediate the said base and second disc members and mounted so as to be free to rotate independently of both the said base and second disc members; a braking element connecting member for connecting the said third disc member with the member to be braked carried by the said third disc member; cooperating locking means carried by the said third disc member and the said braking element connecting member for locking the said braking element connecting member to the said third disc member for rotary motion therewith and permitting relative lateral motion between the said braking element connecting member and the said third disc member; and means for actuating the said second disc member towards the said base disc member for contact with the said third disc member.

8. As an article of manufacture a brake consisting of a first disc member; a second disc member mounted for lateral movement with respect to the said first disc member, both the said first and second disc members having a bridge portion formed therein intermediate their respective ends; a third disc member intermediate the said first and second disc members and mounted so as to be free to rotate independently of the said first and second disc members and to move laterally with respect to the said first and second disc members; a braking element connecting member for connecting the said third disc member with the member to be braked carried by the said third disc member; cooperating locking means carried by the said third disc member and the said braking element connecting member for locking the said braking element connecting member to the said third disc member for rotary movement therewith and permitting relative lateral motion between the said braking element connecting member and the said third disc member; resilient means attached to both the said first and second disc members for preventing rattling between the said two members and resilient means positioned between the said third disc member and the said braking element connecting member for preventing rattle between the said third disc member and the said braking element connecting member; means intermediate the said first and second disc members for normally forcing the said second disc member away from the said first disc member; means, including a toggle mechanism, for actuating the said first and second disc members toward each other for frictional contact with the said third disc member; and means carried by the said toggle mechanism for varying the effective distance between the said first and second disc members.

HARRY FORNEY EBY.